United States Patent [19]
Morton

[11] Patent Number: 5,691,801
[45] Date of Patent: Nov. 25, 1997

[54] HAND-HELD VIEWER FOR MOTION PICTURE CASSETTES

[76] Inventor: Jay Morton, 10228 Shireoaks La., Boca Raton, Fla. 33498

[21] Appl. No.: 638,169

[22] Filed: Apr. 26, 1996

[51] Int. Cl.[6] .............................. G03B 1/00; G03B 21/00
[52] U.S. Cl. ........................ 352/184; 352/129; 352/166
[58] Field of Search ............................. 352/166, 184, 352/187, 129

[56] References Cited

U.S. PATENT DOCUMENTS

| | | | |
|---|---|---|---|
| 1,516,496 | 11/1924 | Owens . | |
| 1,964,879 | 7/1934 | Jelinek | 40/28 |
| 2,122,804 | 7/1938 | Tichenor | 88/17 |
| 2,311,204 | 2/1943 | Bouma | 88/17 |
| 3,265,457 | 8/1966 | Dale | 352/129 |
| 3,306,697 | 2/1967 | Nemeth | 352/129 |
| 3,476,470 | 11/1969 | Dejoux | 352/68 |
| 3,700,321 | 10/1972 | Peters | 353/26 |
| 4,171,881 | 10/1979 | Lewis | 352/72 |
| 4,205,803 | 6/1980 | Elsner | 242/55.21 |
| 4,591,238 | 5/1986 | Kitaoka et al. | 352/122 |
| 5,333,020 | 7/1994 | Tsukada et al. | 352/166 |

FOREIGN PATENT DOCUMENTS

| | | | |
|---|---|---|---|
| 1593591 | 7/1981 | United Kingdom | G03B 17/26 |
| 1593592 | 7/1981 | United Kingdom | G03B 17/26 |

*Primary Examiner*—Safet Metjahic
*Assistant Examiner*—John Chizmar
*Attorney, Agent, or Firm*—Ronald V. Davidge

[57] ABSTRACT

A device for viewing a motion picture film strip held within a cassette includes a film strip drive wheel, turned at a constant speed by a battery-powered motor, having an outer cylindrical surface from which a pin section extends radially. The film strip is held, by guiding surfaces in the cassette, so that it extends in an arc around a portion of the outer cylindrical surface. The pin section engages a sprocket hole in the film strip at the beginning of this arc, and is disengaged from the sprocket hole at the end of this arc. During continued revolution of the drive wheel, the film is held in place as a single frame is viewed through the lens. The lens is focussed by sliding a tab extending from the lens housing within an oblique slot in a cover of the viewing device, as the lens is both rotated about its optical axis and translated along its optical axis.

8 Claims, 2 Drawing Sheets

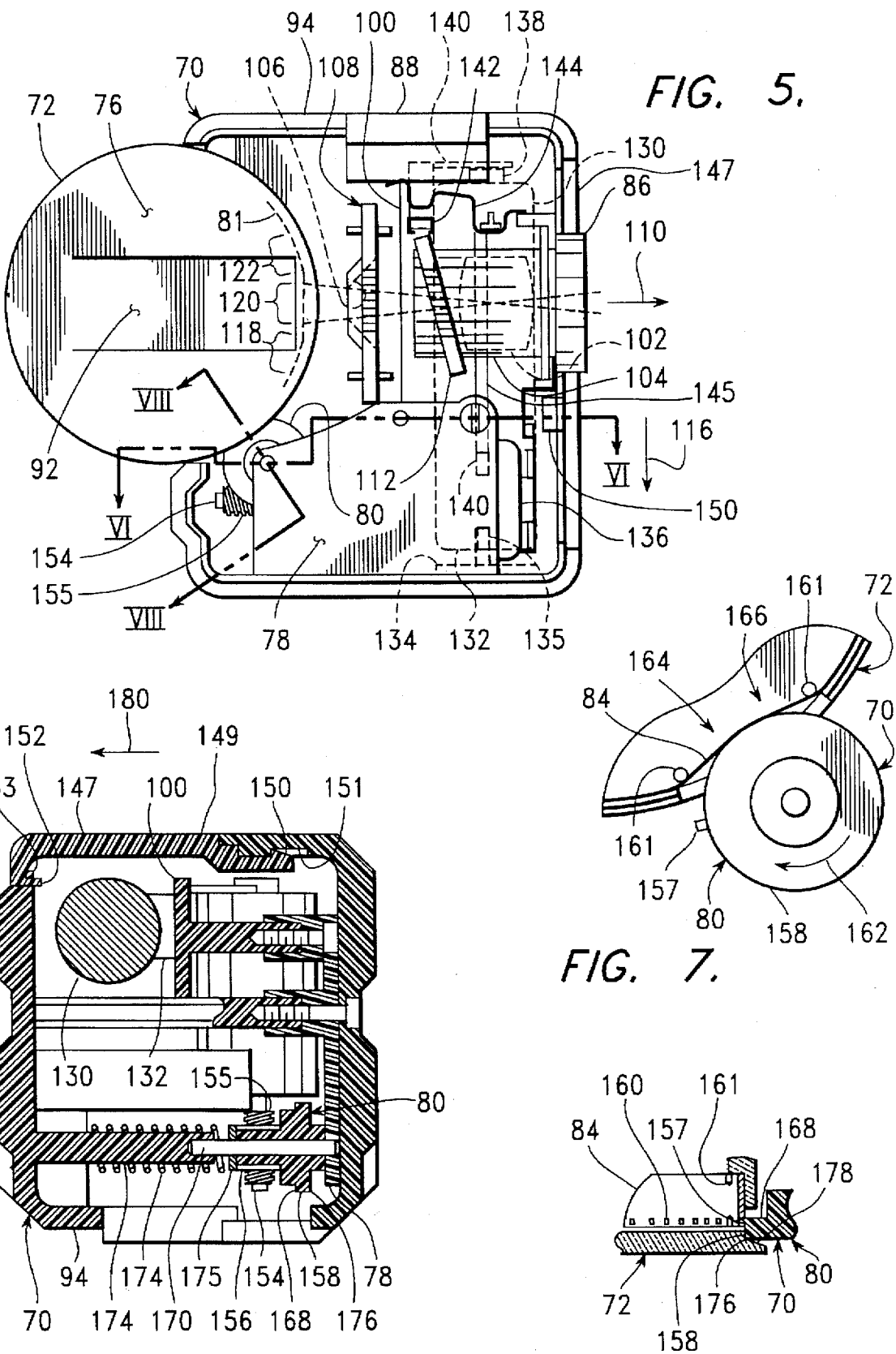

HAND-HELD VIEWER FOR MOTION PICTURE CASSETTES

BACKGROUND OF THE INVENTION

1. Field of the Invention

This invention relates to a hand-held viewer for motion picture cassettes, and, more particularly, a compact version of such a viewer having improved mechanisms for driving the film and focussing the lens.

2. Background Information

Motion picture film is typically viewed in the form of virtual images projected onto a screen. In order to provide the illusion of motion, the projector moves the film strip in a stepping motion. This movement is typically provided by a "claw" mechanism having a tip which moves into the individual sprocket holes in the film strip in succession, driving the portion of the film from which viewing occurs from one frame to the next while engaging a corresponding sprocket hole. Alternately, a "Maltese cross" or "Geneva" mechanism is used to provide incremental rotational movement to a sprocket engaging the film strip. In a typical projector, a loop of slack film must be provided, so that the portion of the film strip being viewed can be moved in this way, while the remaining portions of the film, on each side of the portion being viewed, is moved at a constant speed through the system.

While this typical method works well in relatively large, stationary settings, it does not provide a portable way to view film strips. Children, in particular, enjoy watching short motion images of cartoons and other familiar subjects, and would particularly value an easily portable device facilitating the viewing of motion picture film. Thus, what is needed is a device which is inexpensive to manufacture and easy to carry, even for a child, which can provide the pleasure of motion picture viewing.

3. Description of the Prior Art

British Patents 1,593,591 and 1,593,592 describe a film cassette in which a film strip is stored and viewed as a motion picture. The film strip, in the form of an endless loop, is held within the cassette as a coil, while a portion of the film is pulled off the outside of the coil, fed past a viewing window, and returned to the inside of the coil. Sufficient friction is maintained within the cassette to retard the motion of the film strip, so that, when a reciprocating needle or claw is out of contact with the film strip, it remains stationary as an individual frame is viewed or projected. The needle or claw is moved into a slot in the cassette with tapered walls, assuring its accurate lateral alignment.

What is needed is a compact, simple viewer, operating with interchangeable film cassettes of the general type described in these British patents. In particular, a simplified film drive mechanism is needed to replace the reciprocating claw, and the size of the viewer should be minimized, so that it can be easily carried and used, even by a child, and a simplified lens focussing mechanism is needed to reduce the cost of the device.

SUMMARY OF THE INVENTION

In accordance with one aspect of the invention, there is provided apparatus for handling and moving a film strip having a number of sprocket holes extending along an edge in a uniform spaced-apart relationship. The apparatus includes a drive wheel, a wheel drive mechanism, and a film guide structure. The drive wheel has an outer cylindrical surface from which a pin portion extends outward. The wheel drive mechanism rotates the drive wheel at a constant rotational velocity around the axis of the outer cylindrical surface. The film guide structure holds a portion of the film strip in contact with the outer cylindrical surface along an arcuate path. The pin portion engages an individual sprocket hole, within the number of sprocket holes, at a beginning of the arcuate pate, moves the film strip in engagement with this sprocket hole along the arcuate path, and is released from the individual sprocket hole at an end of the arcuate path. Movement of the film strip in engagement with the pin portion as the pin portion moves along the arcuate path brings a next sprocket hole within the number of sprocket holes into position at the beginning of the arcuate path for engagement with the pin portion.

BRIEF DESCRIPTION OF THE DRAWINGS

FIG. 5 is left side elevational view of the viewer and cassette of FIG. 4, shown with a cover of the viewer removed;

FIG. 6 is a cross-sectional plan view of the viewer of FIG. 4, taken as indicated by cross-section lines VI—VI in FIG. 5;

FIG. 7 is a fragmentary left elevational view of the viewer and cassette of FIG. 5, as shown with a cassette cover and viewer mounting bracket removed, showing a film drive wheel of the viewer of FIG. 5; and FIG. 8 is an fragmentary oblique cross-sectional view of the viewer and cassette of FIG. 5, taken as indicated by cross-section lines VIII—VIII in FIG. 5.

DETAILED DESCRIPTION

Figure 1:
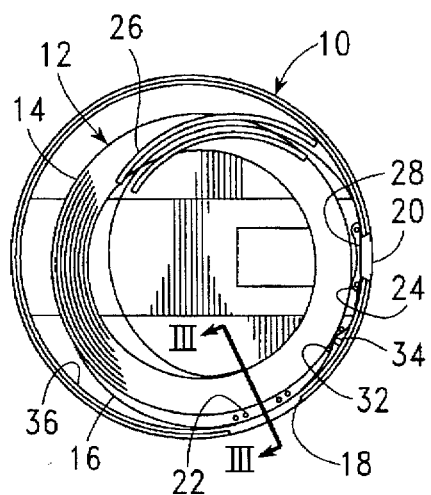
FIG. 1 is a side elevational view of a prior-art film cassette, as shown with a lid removed to reveal an inner film path thereof.

FIG. 1 is a side elevational view of a prior-art film cassette 10, as described in British patents 1,593,591 and 1,593,592, and as shown with a lid removed to reveal an inner film path thereof. Within the cassette 10, an endless film strip 12 is formed into a coil 14. A single loop 16 is pulled off the outside of the coil 14, to be moved past a driving slot 18 and a viewing window 20, and to be returned to the inside of the coil 14. The pulled-off loop 16 is guided by pins 22 on each side of driving slot 18, by pins 24 on each side of viewing window 20, and by guiding surfaces 26 directing the return of film to the inside of coil 14.

The inside surface 28 of the viewing window 20 is flat, and the two guide pins 24 are located so that a portion of the pulled-off loop is flattened against this surface 28 as the film is moved past this window 20. This local flattening is resisted by the normal curvature assumed by the film within the cassette 10, so that frictional forces are established between the film and the inner window surface 28, tending to hold the film in place when it is not acted upon by the driving needle 30 (which will be discussed in reference to FIG. 3) operating through drive slot 18. Additional frictional forces resisting the movement of film are developed as the film passes between guide pins 32 and a bump 34 extending inward from the peripheral wall 36 of the cassette 10. These frictional forces hold the film in place for viewing an image between strokes of the driving claw. Thus, the intermittent motion required for motion simulation can occur without the slack loop required in a conventional motion picture projector. Furthermore, flattening the film against the inner window surface 28 presents the film in a flattened condition at a pre-determined position, as required for accurate focussing of the image of the film, without requiring additional parts, such as a pressure plate.

Figure 2:
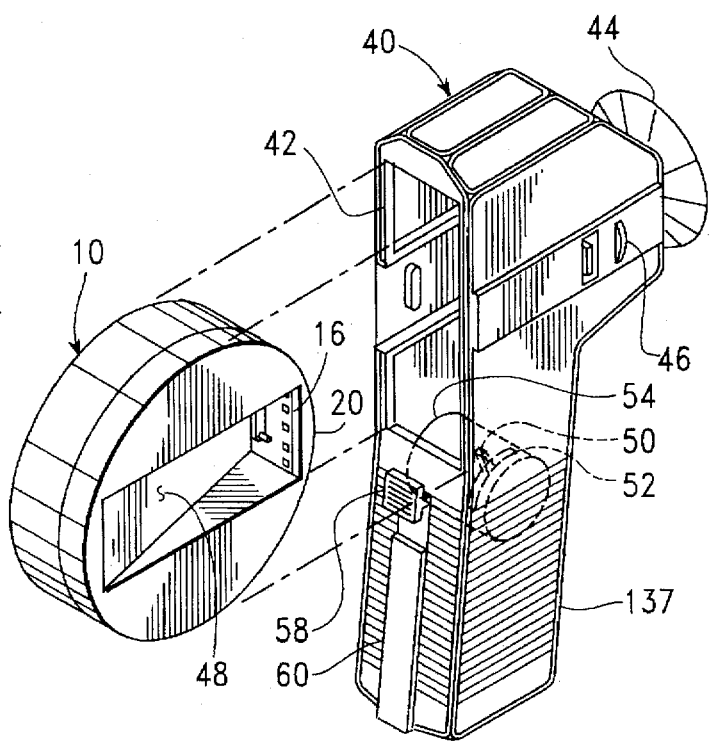
FIG. 2 is an isometric view of the film cassette of FIG. 1, in an exploded relationship with a prior-art film viewer.

FIG. 2 is an isometric view of a film viewer 40, shown externally in British Patents 1,593,591 and 1,593,592, in an exploded relationship with the film cassette 10 described above in reference to FIG. 1. The cassette 10 is snapped into an opening 42, bringing the viewing window 20 of the cassette 10 into alignment with an eye-piece 44 of the viewer 40. A lens (not shown) in the eye-piece 44 is focussed by rotating a knurled wheel 46. When the viewer 40 is used, ambient light passes through a channel 48 in the cassette 10 and through the frame of the pulled-off loop 16 in alignment with viewing window 20 of the cassette, so that the image on this frame can be viewed through the eye-piece 44.

With the cassette 10 snapped into place within opening 42, the pulled-off loop 16 of film is driven in a step-wise movement by a pin 50 reciprocating in a slot 52, with this pin 50 being in-turn driven in a reciprocating fashion by an electrical motor 54. At the end of each movement of the pin 50 in engagement with a sprocket hole of the film strip, the pin 50 is withdrawn from the film strip and returned to engage the next sprocket hole. The motor 54 is driven by batteries (not shown) within a handle 56 of the viewer whenever the person using the device manually operates a switch 58. Access to the batteries (not shown) is achieved through the removal of a cover 60.

Figure 3:
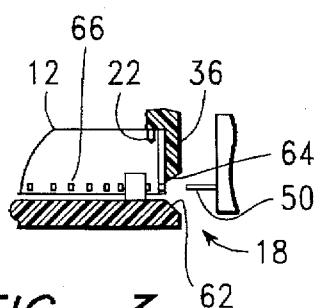
FIG. 3 is a fragmentary cross-sectional view of the film cassette and viewer of FIG. 2, taken as indicated by section lines III—III in FIG. 1 to show particular aspects of the mechanism used to drive the film strip within the cassette in a step-wise fashion.

FIG. 3 is a fragmentary cross-sectional view of the film cassette and viewer of FIG. 2, taken as indicated by section lines III—III in FIG. 1 to show particular aspects of the mechanism driving the film strip in a stepping motion. The drive slot 18 in peripheral wall 36 cassette of cassette 10, through which drive pin 50 operates, is provided with opposing tapered surfaces 62, 64, ensuring that the pin 50 is accurately aligned with the sprocket holes 66 within the film 12. These sprocket holes 66 are of substantially the same width as the drive slot 18 as it is reduced by the taper of surfaces 62, 64.

Figure 4:
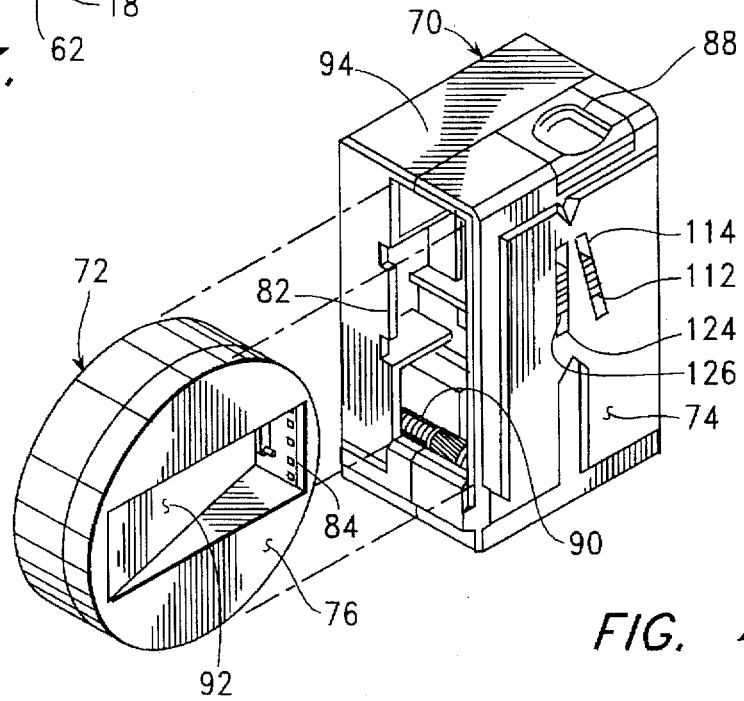
FIG. 4 is an isometric view of a viewer built in accordance with the present invention, shown in an exploded relationship with a compatible film cassette.

FIGS. 4–8 show a motion picture viewer 70 built in accordance with the present invention. FIG. 4 is an isometric view of the viewer 70, shown in an exploded relationship with a compatible film cassette 72, as viewed from the rear, from the left, and from above. FIG. 5 is left side elevational view of the viewer 70 and cassette 72, shown with a cover 74 of the viewer 70 removed. FIG. 6 is a cross-sectional plan view of the viewer 70, taken as indicated by cross-section lines VI—VI in FIG. 5. FIG. 7 is a fragmentary left elevational view of the viewer 70 and cassette 72, as shown with the left viewer cover 74 (shown in FIG. 4), a cassette lid 76, and viewer mounting bracket 78 (both shown in FIG. 5) removed, to particularly show a film drive wheel 80. FIG. 8 is an fragmentary oblique cross-sectional view of the cassette 72 and drive wheel 80, taken as indicated by cross-section lines VIII—VIII in FIG. 5.

The general features of the viewer 70 will now be discussed, with particular reference being made to FIGS. 4 and 5.

Referring first to FIG. 4, the viewer 70 includes, extending vertically along its rear side, an opening 82 into which a compatible cassette 72 is inserted. The cassette 72 includes, for example, various of the prior-art features described above in reference to FIGS. 1–3.

Referring additionally to FIG. 5, when the cassette 72 is fully inserted within the viewer 70, a frame from a film loop 84 within the cassette, is viewed through an eye-piece 86 at the front of the viewer. When a button 88 at the top of the viewer 70 is depressed, a film drive mechanism 90 is electrically operated to move the film strip 84 in the incremental motion pattern required to provide an illusion of image motion. This incremental motion continues as long as button 88 is held depressed but stops when button 88 is released. During viewing, external light shines through the film strip 84 from an oblique slot 92 in the cassette 72. The cassette 72 is preferably composed of a clear thermoplastic material, aiding in the transmission of light from various angles. Primary structural components of the viewer 70 include the cover 74, a housing 94, the mounting bracket 98, and an intermediate bracket 100.

The optical components of viewer 70 will now be discussed, with continued reference being made to FIG. 5. The eyepiece 86 slideably and rotatably mounts a generally cylindrical lens housing 102, within which a viewing lens 104 is permanently mounted. The image from film strip 84 is viewed through the lens 104 and through an aperture 106 in sliding plate 108.

In order to adjust for differences in the visual characteristics of individual users of the viewer 70, the lens 104 is made adjustable along its optical axis (i.e. outward, in the direction of arrow 110, and inward, opposite this direction). For this purpose, lens holder 102 is provided with an obliquely-inclined tab 112, a central portion of which extends through a similarly inclined slot 114 in cover 74 (shown in FIG. 4). To move lens 104 outward, in the direction of arrow 110, the tab 112 is pushed downward, in the direction of arrow 116. To move lens 104 inward, opposite the direction of arrow 110, the tab 112 is pushed upward, opposite the direction of arrow 116. In either case, constraining the central portion of tab 112 to move within inclined slot 114 causes the lens to move along its optical axis as it rotates.

This method of lens focussing has particular advantages of simplicity and low cost, when it is compared to the conventional method of using a focussing wheel. For example, a focussing wheel 46 is described in the prior-art viewer of FIG. 2. A focussing wheel is usually held so that, while it is rotated, it does not move along the optical axis of the lens, with a helical thread arrangement being used to effect the translation of rotary motion of the focussing wheel into linear motion of the lens. Alternately, the focussing wheel can move linearly and rotationally with the lens, with a helical thread arrangement between the lens and a stationary frame member of the unit being required to effect the translation of rotary lens motion into linear lens movement. In such conventional configurations, the helical thread arrangement tends to be relatively expensive and difficult to manufacture. On the other hand, the arrangement of the present invention uses the angle of inclination of the slot 114, which is easily formed as part of the molded plastic cover 74, to change downward rotary motion of the tab 112 into movement of the lens 104 along its optical axis, without a need for a separate, additional part. Considerations of this sort are particularly important when they are applied to a small toy, which must be sold at a relatively low price.

Continuing to refer to FIG. 5, the incremental motion imparted to the film strip 84 results in the various images recorded on the film strip being stopped at certain fixed positions along the path of the film strip within the cassette 72. For example, each such film image is stopped a first position 118, then moved to a second position 120, and then moved to a third position 122. While the locations of these positions 118, 120, and 122 remain essentially constant as a single film strip 84 is viewed using a single viewer 70, variations among individual viewers 70 and film cassettes 72 can be expected to cause variations in the locations of these positions 118, 120, and 122.

The physical location, in a direction extending longitudinally along film strip 84, from which images are displayed within the viewer 70 is determined by the vertical position of sliding plate 108, with the aperture 106 in this plate 108 limiting the illuminated image area from which light travels through lens 104. To facilitate the movement of sliding plate 108, a tab portion 124 of this plate 108 extends through a vertical slot 126 in cover 74 (shown in FIG. 4). Thus, when the sliding plate 108 is correctly positioned, the central image at position 120 is viewed. If the sliding plate 108 is too high, a part of this central image at position 120 is seen, together with a part of the next image at position 122. If the sliding plate 108 is too low, a part of this central image at position 120 is seen, together with a part of the previous image at position 118. Distinctions of this kind can be easily made and corrected during operation of the viewer 70 by moving tab 124.

The electrical operation of viewer 70 will now be discussed, with continued reference to FIG. 5. Electrical power for film feeding is derived from a single AA electrical "battery" cell 130. The negative terminal 132 of cell 130 is connected through a spring (not shown) and a lower battery terminal 134 to a lower motor terminal 135 of a permanent-magnet motor 136. The positive terminal 138 of cell 130 is connected through an upper battery terminal 140 to a formed contact 142. An electrical circuit between cell 130 and the motor 136 is completed when button 88 is depressed, deflecting contact spring 144 downward, into electrical contact with formed contact 142. When this contact occurs, a strip 145, descending as a part of contact spring 144, supplies the voltage present at formed contact 142 to the upper terminal 146 of motor 136.

The cell 130 is removable and replaceable through a removable battery cover 147, which is slid in the direction of arrow 148, with depression in an area 149 releasing a latch 150 from a cavity 151 in cover 74. When the battery cover 147 is closed, it is held in place by latch 150 and by a pair of tabs 152 extending through slotted tabs 153 in housing 94.

The arrangement of components providing for electrical operation of the viewer of the present invention offers advantages over the prior-art device described above in reference to FIG. 2. The device built in accordance with the present invention is held to the eye in the general manner of an optical device, such as a telescope, being supported from below by a thumb, while the button 88 is depressed by a forefinger. The prior-art device is held by closing the fingers around a descending handle 137 holding a battery (not shown). The compact size and shape of the viewer 70 of the present invention is facilitated by the placement of cell 130 beside lens 104 and motor 136, instead of in a descending handle, as described in the prior art. The compact size and shape of a viewer built in accordance with the present invention when the desire of a child using the device to transport it within his pocket is considered.

The film drive mechanism will now be discussed, with particular references to FIGS. 6–8.

Referring first to FIG. 6, when an electrical connection is made as described above in reference to FIG. 5, motor 136 is turned on, causing the rotation of a motor shaft 154 to which a worm gear 155 is fastened. This worm gear 155 meshingly engages a worm wheel portion 156 of film drive wheel 80, causing the drive wheel 80 to turn at a rotational speed substantially lower than that of motor shaft 50.

Referring to FIGS. 7 and 8, film drive wheel 80 includes a drive pin 157 extending outward from an outer cylindrical surface 158 to engage individual sprocket holes 160 in film strip 84. When the film cassette 72 is fully inserted into the viewer 70, a pair of guiding pins 161 in the cassette hold the film strip 84 in contact with an arcuate portion of the outer cylindrical surface 158. During operation of the viewer 70, with button 88 (shown in FIG. 5) depressed, film drive when 80 rotates in the direction of arrow 162, with pin 157 engaging a sprocket hole 160 in the region indicated by arrow 164, driving the film strip 84 through a short distance with the motion of pin 157 within the sprocket hole 160, and releasing the film strip 84 as the pin 157 is pulled out of the hole 160 in the region indicated by FIG. 7. The motion imparted in this way moves the film strip 84 from one "frame," or image area (not shown) in which a picture is viewed through lens 104, to the next. The film strip 84 remains stationary during the remaining portion of the rotation of the rotation of drive wheel 80, with an individual image area being viewed through the aperture 106 and lens 104 as described above.

It is desirable that the film strip 84 stop quickly whenever the drive pin 157 disengages from a drive sprocket 160. To this end, for example, one or more of the prior-art methods, described above in reference to FIG. 1, for providing frictional forces retarding the motion of film strips is/are employed within the cassette 72.

Satisfactory results have been obtained, in the application of this film drive method to standard 8-mm film, using a wheel 80 with an outer cylindrical surface 158 having a diameter of 12.5 mm (0.493 in.), from which a 0.5 mm (0.02 in.) square pin 157 extends radially outward through a distance of 6.4 mm (0.025 in.). The side of pin 157 at inner wheel surface 168 is tapered at a 20-degree angle, so that the end of the pin is only 0.3 mm (0.011 in.) wide. The rotational speed of wheel 80 is determined to provide a desired number of frames per second through the viewing process.

While small differences may occur, from one frame to another, in the distance through which the film strip 84 is driven by the drive wheel 80, such differences do not accumulate. That is, if the film strip 84 is driven too far, the next sprocket hole 160, is moved farther than normal, so that it is engaged later than normal by the pin 157 for the next film strip movement, which is accordingly shortened. Similarly, if the film strip 84 is driven through too short a distance, the next sprocket hole 160 is not moved as far as it normally is, so that it is engaged earlier than normal by the pin 157 for the next film strip movement, which is accordingly lengthened.

This mechanism for driving the film strip within the present invention has an advantage of simplicity and low cost over the film driving mechanisms of the prior art, such as the prior-art film feeding mechanism discussed above in reference to FIGS. 2 and 3. In such prior-art mechanisms, a pin or claw must be moved into a sprocket hole within the film, driven along with the film in engagement therewith through the sprocket hole, withdrawn from the sprocket hole, and returned to engage the next sprocket hole. This series of motions must occur for each frame that is viewed.

On the other hand, with the film drive mechanism of the present invention, the incremental movement of film is accomplished simply using the rotation of a wheel, having an integral pin, at a constant rotational velocity.

Referring again to FIG. 6, the film drive wheel 80 is slidably and rotatably mounted on a stationary rod 170, which extends between mounting bracket 78 and a boss 172 extending inward as a part of housing 94. When no cassette 72 is installed in the viewer 70, a compression spring 174, pushing against a washer 175, holds the drive wheel 80 against the bracket 78.

Referring additionally to FIG. 8, when the cassette 72 is inserted into the viewer 70, a peripheral edge 176 of drive wheel 80 contacts an inclined surface 178 of the cassette 72. As the cassette 72 is fully inserted, contact between edge 176 and surface 178 moves the drive wheel 80 in the direction of arrow 180, against the force of compression spring 174, bringing the drive pin 157 of drive wheel 80 into accurate alignment with the sprocket holes 160 in film strip 84. During operation of the viewer 70, contact between edge 176 and surface 176 continues, with the rotation of drive wheel 80 in the direction of arrow 162 (as shown in FIG. 7), guiding the drive pin 157 into alignment with each sprocket hole 160.

This method for maintaining alignment between the film driving surfaces (of wheel 80) and the sprocket holes in the film strip has an advantage over the prior-art method described above in reference to FIG. 3 in that contact is maintained with a smooth edge of the wheel. In the prior-art method, this contact is intermittent, as the drive pin is driven into engagement with the film strip. Such intermittent contact can be expected to increase the level of wear occurring particularly at the drive pin.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus for handling and moving a film strip having a plurality of sprocket holes extending along an edge in a uniform spaced-apart relationship, wherein said apparatus comprises:

a drive wheel having an outer cylindrical surface and a pin portion extending outward from said outer cylindrical surface;

wheel drive means for rotating said drive wheel at a constant rotational velocity around an axis of rotation extending along a longitudinally extending center of said outer cylindrical surface; and film guide means for holding a portion of said film strip in contact with said outer cylindrical surface along an arcuate path, wherein said pin portion engages an individual sprocket hole within said plurality thereof at a beginning of said arcuate path, moves said film strip in engagement with said individual sprocket hole along said arcuate path, and is released from said individual sprocket hole at an end of said arcuate path, with movement of said film strip in engagement with said pin portion as said pin portion moves along said arcuate path bringing a next sprocket hole within said plurality thereof into position at said beginning of said arcuate path for engagement with said pin portion.

2. The apparatus of claim 1, wherein said wheel drive means includes:

an electric motor mechanically driving said drive wheel;

an electrical cell; and a switch mechanism connecting said electrical cell in a circuit with said electric motor.

3. The apparatus of claim 2:

wherein said apparatus comprises additionally a window through which images on said film strip are exposed to a lens; and wherein said drive wheel is rotated at a speed sufficient to provide an illusion of motion as said images are viewed sequentially.

4. The apparatus of claim 1, wherein said film strip and said film guide means are held within a cassette which is separate from, and removable from, said drive wheel and said wheel drive means.

5. The apparatus of claim 4:

wherein said drive wheel is mounted to slide linearly along said axis of rotation; and wherein said drive wheel is pushed along said axis of rotation against an alignment surface of said cassette by a spring, holding said pin portion in alignment with sprocket holes in said plurality thereof.

6. The apparatus of claim 1:

wherein said outer cylindrical surface has a diameter of 12.5 mm; and wherein said pin portion is 0.5 mm square, extending radially outward through a distance of 6.4 mm.

7. The apparatus of claim 1, wherein, after said pin portion is released from said individual sprocket hole at said end of said arcuate path, said pin portion is moved to said beginning of said arcuate path with continued rotation of said drive wheel at said constant rotational velocity.

8. The apparatus of claim 1:

wherein said outer cylindrical surface has a diameter of 12.5 mm; and wherein said pin portion is 0.5 mm square, extending radially outward through a distance of 6.4 mm.

* * * * *